United States Patent [19]

Kure-Jensen et al.

[11] 4,318,179

[45] Mar. 2, 1982

[54] THRUST BEARING MISALIGNMENT MONITOR

[75] Inventors: Jens Kure-Jensen, Schenectady; Adrian Missana, Scotia, both of N.Y.

[73] Assignee: General Electric Company, Schenectady, N.Y.

[21] Appl. No.: 155,379

[22] Filed: Jun. 2, 1980

[51] Int. Cl.$^3$ .......................................... G01M 13/04
[52] U.S. Cl. ................................. 364/506; 364/557; 73/462
[58] Field of Search ...................... 364/506, 557, 550; 73/140, 462; 60/399, 657

[56] References Cited

U.S. PATENT DOCUMENTS

| | | | |
|---|---|---|---|
| 3,873,817 | 3/1975 | Liang | 364/506 |
| 3,932,740 | 1/1976 | Mueller | 364/506 X |
| 3,979,579 | 9/1976 | Kleinpeter | 364/506 |
| 4,015,480 | 4/1977 | Giers | 364/508 X |
| 4,031,366 | 6/1977 | Hartung | 364/506 |
| 4,103,979 | 8/1978 | Kuhn | 308/160 |
| 4,109,312 | 8/1978 | Beutel | 364/550 X |
| 4,118,933 | 10/1978 | Coleman | 73/766 |
| 4,135,246 | 1/1979 | McMannis | 364/506 X |
| 4,173,869 | 11/1979 | Martin, Jr. et al. | 364/557 X |
| 4,246,640 | 1/1981 | Babil et al. | 364/557 X |

*Primary Examiner*—Edward J. Wise
*Attorney, Agent, or Firm*—Ormand R. Austin; John F. Ahern

[57] ABSTRACT

An apparatus for continuously monitoring the alignment condition of a thrust bearing based on a pair of temperature differences is adapted to utilize either analog or digital means. The monitor is particularly applicable for use in large turbines, particularly those coupled to generators for the production of electric power. Bearing misalignment and other variables are determined from temperature measurements of the oil feed temperature and from two temperature measurements made on diametrically opposite portions of the bearing surface. The apparatus of the present invention is made possible by observed predetermined relations between certain computed temperature differences which relate bearing thrust and misalignment moment and which also relate minimum oil film thickness and actual misalignment slope.

9 Claims, 4 Drawing Figures

THRUST BEARING MISALIGNMENT MONITOR

BACKGROUND OF THE INVENTION

The present invention relates to an apparatus and a method for determining thrust bearing misalignment. More particularly, the present invention relates to a thrust bearing misalignment monitor employing thermal measurements to determine misalignment.

Thrust bearings are employed in many machinery articles to prevent excessive axial motion of rotating shafts. Thrust bearings often include fixed Babbitt metal surfaces which interface with a collar portion on the rotating shaft. Thrust bearings find particular applicability in the turbine portions of large steam turbine-generator combinations which are employed by electric utilities. In these turbines, rotating turbine blades or buckets are disposed between stationary turbine diaphragms with clearances between stationary and rotating parts of only a few thousandths of an inch. The turbine rotors typically rotate at speeds of 1800 rpm or 3600 rpm and have rotor radii of as much as 40 or 50 inches or more. It is thus apparent that the linear velocity at the rotor tips is extremely high and may even be transonic. Because of this high velocity and the close tolerances demanded by efficiency considerations, it is seen that the role of the thrust bearing is crucial in preventing axial motion of the turbine rotor. Moreover, because of the large weight of these turbine rotors, vertically acting gravitational forces tend to make vertical misalignment, between the thrust bearing surface and the rotating thrust bearing collar, a more significant problem than that associated with horizontal misalignment. It thus becomes particularly preferable to have continuous monitoring of the vertical misalignment condition.

Thrust bearings are in general provided with some kind of lubricant, such as oil, from a lubricating system. The lubrication system functions to maintain a lubricant film between the thrust bearing surface and the surface of the collar on the rotating shaft. It is, of course, desirable to maintain a minimum film thickness between these surfaces so as to prevent a "wipe" during which there is metal-to-metal contact. For these reasons it is also desirable to be able to continuously monitor the oil film thickness, or at least ensure that minimum oil film thickness design criteria are not being exceeded.

A further aspect of thrust bearings is also noted herein, particularly with respect to thrust bearings which are typically found in large steam turbines. These bearings are typically divided by radial gaps into a plurality of plates or lands circumferentially arranged so as to interface with an annular portion of the thrust collar on the rotating shaft. These lands form what might be described as a set of thermal islands, since the temperature at the surfaces of the individual lands are at least somewhat independent.

In the past, monitoring of the thrust bearing has been accomplished by employing thermocouples embedded in the lands to measure bearing temperature. However, neither bearing misalignment, minimum film thickness, thrust load nor misalignment moment have been determined solely from observations of thrust bearing temperature. Not only would it be highly desirable to obtain such information, but such information is significantly useful if provided on a continuous basis. In the past, other methods of determining bearing misalignment have necessitated disassembly and inspection of the thrust bearing surface itself.

SUMMARY OF THE INVENTION

In accordance with a preferred embodiment of the present invention an apparatus for determining alignment of a lubricated thrust bearing comprises: at least one pair of temperature sensors disposed on the thrust bearing in substantially diametrically opposed positions so as to produce signal values $T_1$ and $T_2$ representative of the temperatures at the respective sensor locations; temperature sensor means operating to produce a signal value $T_o$ representative of the bearing lubricant feed temperature; and computing and display means receiving signal values $T_1$, $T_2$ and $T_o$ and operating thereon to indicate the state of bearing alignment. Preferably the computing and display means operates to produce signal value $\Delta T$, representative of $T_1 - T_2$, and signal value $T_m'$ which is representative of $\max(T_1,T_2) - (T_o - T_{or})$ where preferably $T_{or}$ is representative of a predetermined lubricant design temperature. The display means receives signal values $\Delta T$ and $T_m'$ and operates on these values to produce an indication of the state of bearing alignment. The indication may take a variety of forms including lighted indicators annunciating normal, marginally normal, or abnormal levels of misalignment. Alternatively, the display means may be an x-y plotter having a recording medium such as paper, premarked with regions indicating "normal", "marginally normal" and "abnormal". Also, a cathode ray tube (CRT) may be employed where the operating condition is shown in similarly premarked regions.

In accordance with another embodiment of the present invention, a method for determining alignment of a lubricated thrust bearing comprises the steps of determining representative temperature values at at least two diametrically opposed points of the thrust bearing; determining values representative of the bearing lubricant temperature; and computing a pair of temperature differences which are compared jointly with predetermined design specifications to determine the state of bearing alignment.

Accordingly, it is an object of the present invention to provide an apparatus and a method for the effective determination of the state of thrust bearing misalignment. It is a further object of the present invention to provide a thrust bearing misalignment monitor capable of continuously monitoring thrust bearing parameters such as misalignment, minimum oil film thickness, thrust and misalignment moment. It is a further object of this invention that these thrust bearing parameters be determined from as few as three distinct temperature measurements.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1A:
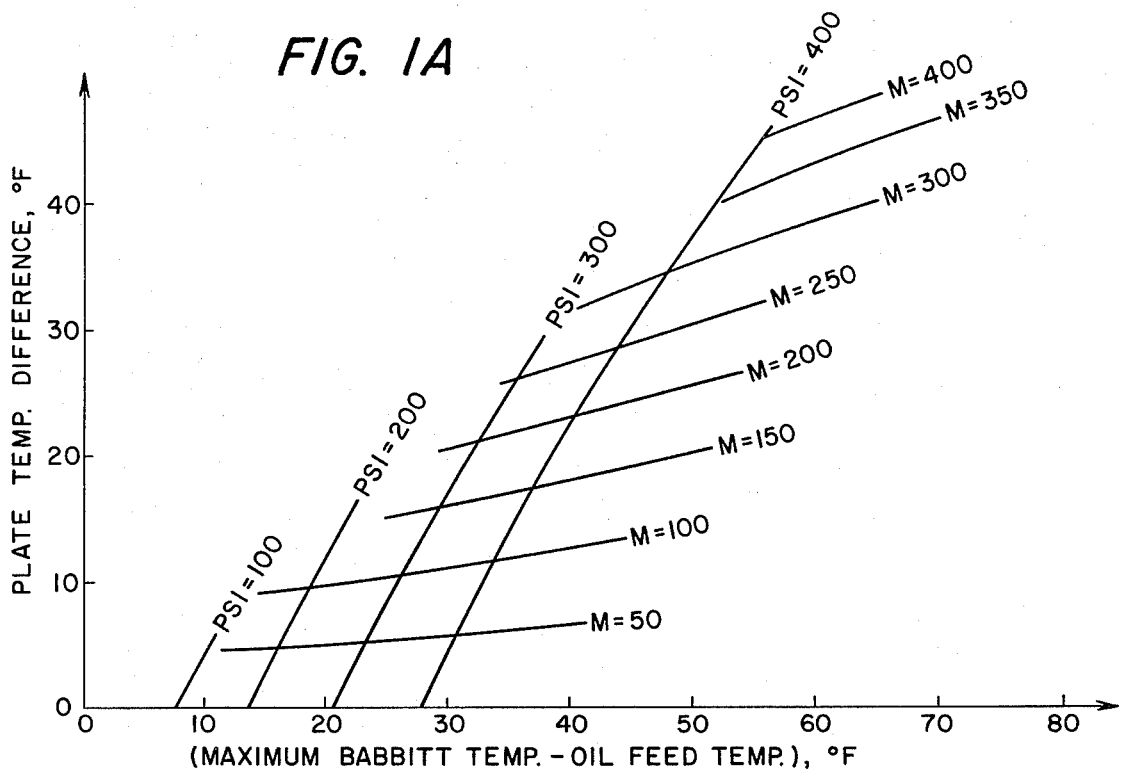
FIG. 1A is a pair of curve sets illustrating the relationship between misalignment moment and thrust as a function of a pair of temperature differences shown on the vertical and horizontal axes.
Figure 1B:
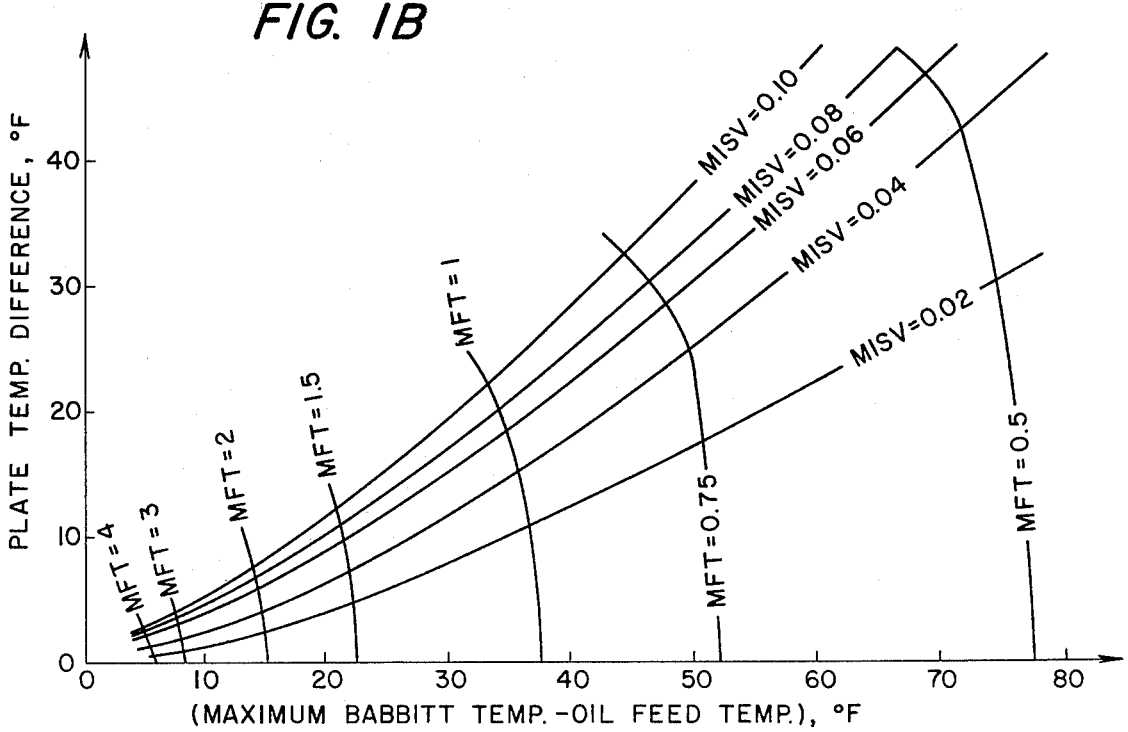
FIG. 1B is a pair of curve sets illustrating the relationship between minimum film thickness and misalignment as a function of a pair of temperature differences shown on the vertical and horizontal axes.

In order to best understand the theory of operation of the present invention, the graphs in FIGS. 1A and 1B are first discussed. It particularly bears noting at this point that FIGS. 1A and 1B have been drawn as two separate sets of curves; however, this separation is only for convenience and clarity, so that an uncluttered picture of the various dependencies may be more clearly discerned. It is through these dependencies and interrelationships, which have been previously unknown, that one is led to an understanding of the operation of the misalignment monitor of the present invention. In both FIGS. 1A and 1B, the vertical axis is shown in degrees F. and represents the plate or land temperature difference $T_1 - T_2 = \Delta T$. This temperature difference is found by measuring the temperature of the lands, for example, by thermocouples, at two diametrically opposite positions on the bearing surface. The horizontal axis in FIGS. 1A and 1B represents the difference between the maximum of the two aforementioned temperatures and the feed oil temperature $T_o$, as measured, for example, by a thermocouple in the oil supply line (again, as measured in degrees Fahrenheit). For convenience we can refer to the vertical axis as $\Delta T$ and to the horizontal axis as $T_m - T_o$ where $T_m$ is the maximum of $T_1$ and $T_2$ and $\Delta T$ is the difference between $T_1$ and $T_2$.

The nearly vertical lines in FIG. 1A, labeled PSI, show the relation between $\Delta T$ and $T_m - T_o$ for various values of the net thrust load. For example, the first curve on the left in FIG. 1A shows the temperature variation for a net thrust load of 100 pounds per square inch. Other thrust load curves are similarly labeled. Also in FIG. 1A the nearly horizontal curves labeled M indicate the variation of $\Delta T$ as a function of $T_m - T_o$ for various values of the misalignment moment M as measured in thousands of inch-pounds. For example, the curve closest to the horizontal axis, labeled $M = 50$, corresponds to a misalignment moment of 50,000 inch-pounds. The numerical values given are for illustration only and vary from one specific design and operating speed to another. Curves for other values of the misalignment moment M are similarly indicated. Accordingly, from FIG. 1A it is seen that the thrust load and the bearing misalignment moment determine $\Delta T$ and $T_m - T_o$ and vice versa.

Similarly, there are two sets of curves illustrated in FIG. 1B. The nearly vertical curves shown in FIG. 1B illustrate the dependence of $\Delta T$ on $T_m - T_o$ for various values of minimum lubricant film thickness. For example, the curve designated $MFT = 1$ illustrates this dependency for a minimum film thickness of 0.001 inches. That is to say, the indicated film thicknesses shown in FIG. 1B are given in thousandths of an inch. Additionally, shown in FIG. 1B are a more nearly horizontal set of curves indicating the dependency of $\Delta T$ on $T_m - T_o$ for various values of the misalignment slope between the thrust bearing and the collar expressed in thousandths of an inch per inch. For example, the curve designated $MISV = 0.04$ is the curve for a vertical misalignment of 40 millionths of an inch per inch. Thus, it can be seen from FIG. 1B, that given a value of $\Delta T$ and $T_m - T_o$ corresponding values for the minimal film thickness and vertical misalignment can be determined. It is, of course, desirable to operate thrust bearings with a relatively large film thickness between the bearing surfaces to prevent damaging contact and to reduce friction. Accordingly, it is more desirable that an operating point be chosen to the left of a specified minimum film thickness curve. That is to say, once a minimum film thickness design value has been determined an operating region defined in terms of $\Delta T$ and $T_m - T_o$ is readily defined from FIG. 1B. Likewise, in an analogous way design values for the misalignment moment M can be specified in which case, as can be seen from FIG. 1A, desirable operating regions in terms of $\Delta T$ and $T_m - T_o$ are readily defined as lying below a specified misalignment moment of a curve.

The experimental data produced in the graphs shown in FIGS. 1A and 1B were derived from calculations and measurements on a 273 square inch double thrust bearing operating at a speed of 1800 rpm and with a 140° oil supply temperature (that is to say, a 140° feed groove temperature). Similar graphs can be determined for other bearings and other rotational speeds.

Figure 2:
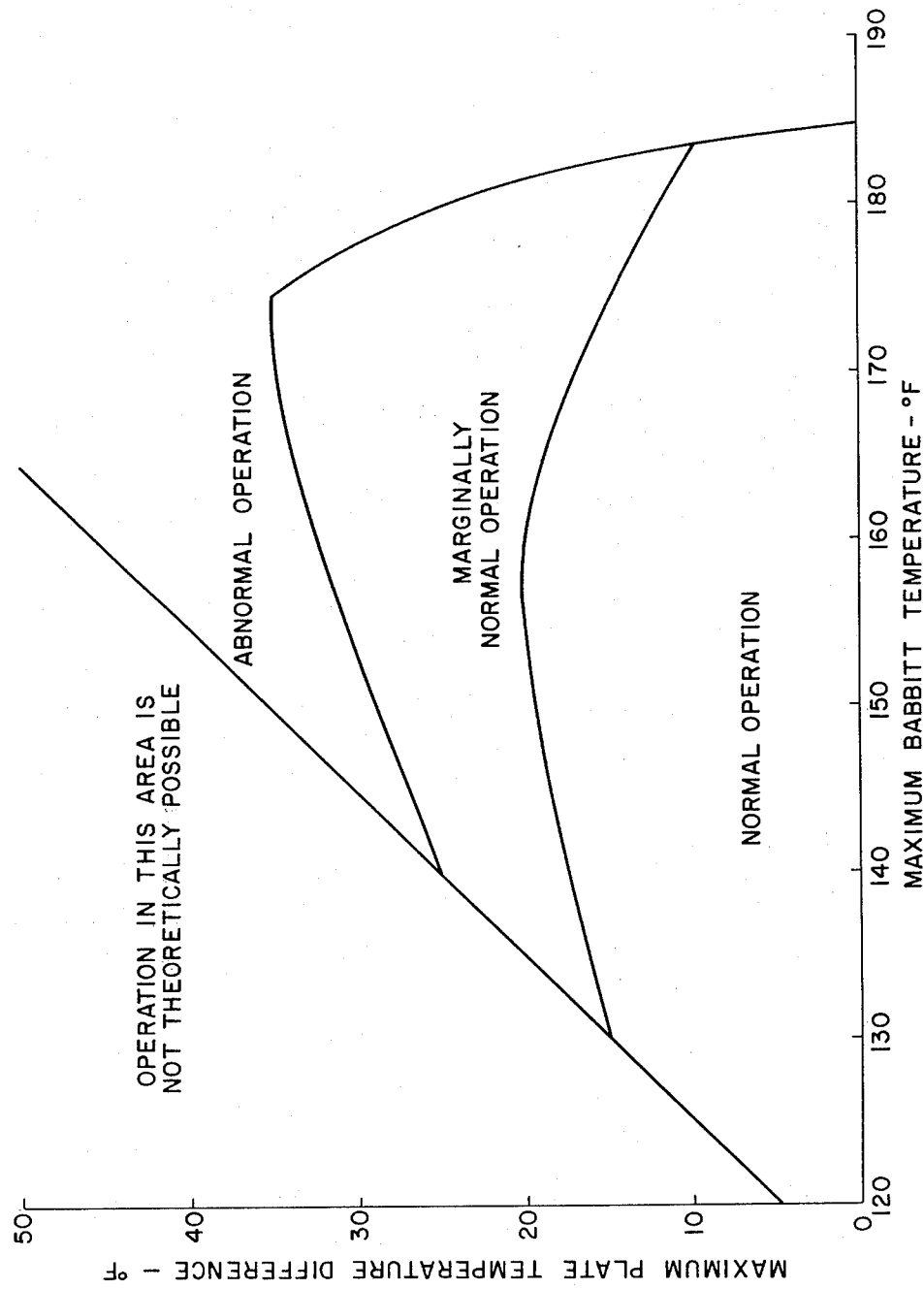
FIG. 2 is a graph illustrating normal, marginally normal and abnormal regions of operation as a function of $\Delta T$ and $\max(T_1, T_2)$.

Consideration is now directed to FIG. 2 which is directly derivable from curves such as those shown in FIGS. 1A and 1B. FIG. 2 implements certain design criteria for thrust bearing operation in terms of defining an acceptable minimum film thickness and misalignment moment. Additionally, it is to be noted that, during normal steady state thrust bearing operation, temperatures $T_1$ and $T_2$ measured on the thrust bearing surface are each greater than the feed oil supply temperature $T_o$. Thus, the straight line defined by the equation $T_m - T_o = \Delta T$ in FIG. 2 defines a region of operation which is not theoretically possible. This region lies upward and to the left of the straight line shown as the leftmost curve in FIG. 2. Thus, actual desirable operating regions may be defined by curves derived from the misalignment moment and minimum film thickness curves of FIGS. 1A and 1B. As indicated above, the approximately horizontal moment curves M define regions of $\Delta T$ and $T_m$ lying below these moment curves in which thrust bearing misalignment is acceptable. Similarly, these desirable regions are likewise defined by minimum film thickness curves, the desirable regions lying to the left of such curves. Thus, the boundary between marginally normal operation and abnormal operation shown in FIG. 2 is determined by selection of a moment curve M and selection of a film thickness curve MFT. The exact location of this boundary depends on the design criteria selected. It should also be noted with respect to FIG. 2 that the curves have been shifted to the right to eliminate the explicit dependence on $T_o$ which merely shifts the position of the curves along the horizontal axis. Accordingly, $T_o$ is now indicated by the x-intercept of the straight line (leftmost curve) shown in FIG. 2.

It is thus seen that from curves such as shown in FIG. 2 abnormal, marginally normal and normal regions of operation for the thrust bearing may be determined as a function of $\Delta T$ and $T_m$ which quantities are readily ascertainable from a pair of diametrically opposed thermocouples and a single thermocouple disposed within the lubricant flow path for the thrust bearing.

Figure 3:
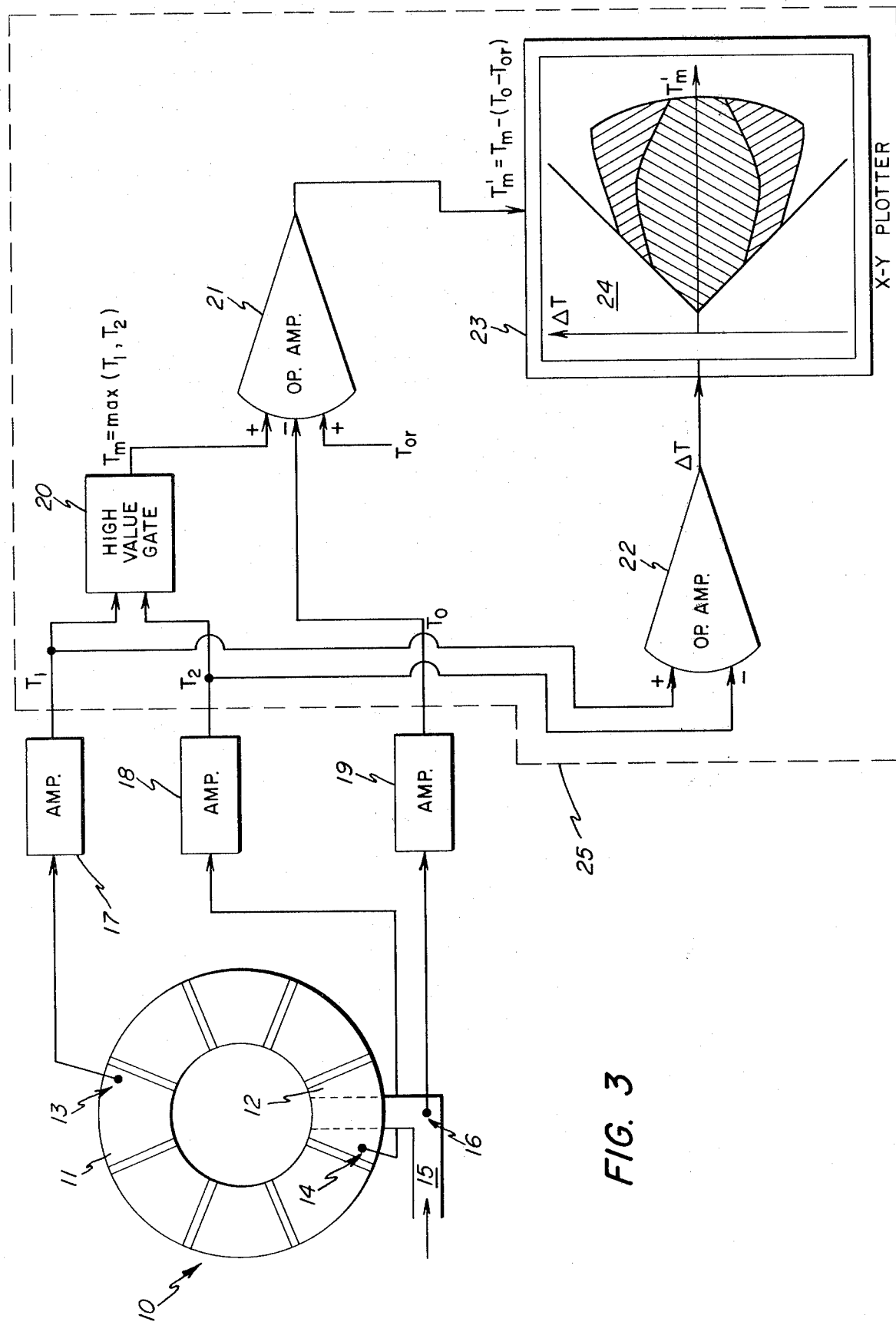
FIG. 3 is a functional block diagram illustrating one embodiment of the present invention employing analog circuits.

Consideration is now given to FIG. 3 in which there is shown an embodiment of applicants' invention employing the above-described dependencies in a novel and useful fashion. In particular, thrust bearing 10 has a bearing surface having a plurality of lands, such as lands 11 and 12 as shown. These lands are typically separated by radially spaced gaps, and, in effect, the lands define a plurality of thermal islands. The bearing is lubricated by the flow of lubricant 15, such as oil, whose temperature is monitored by thermocouple 16 disposed within the flow path. Because vertical misalignment is a greater problem in large steam turbines, thermocouples 13 and 14 are disposed so that they measure temperatures at substantially diametrically opposite directions from a horizontal axis. Each of the thermocouples 13, 14 and 16 are preferably electrically coupled to amplifiers 17, 18 and 19, respectively, whose outputs are signals having values $T_1$, $T_2$ and $T_o$, respectively, which are representative of the temperatures of lands 11, 12 and the feed oil temperature, respectively. Signal values $T_1$ and $T_2$ are received by an analog high value gate circuit 20, said circuits being conventionally available and familiar to those skilled in the electrical arts, said gate operating to produce a signal value $T_m$ representative of the larger of either $T_1$ or $T_2$. Mathematically, this relationship may be defined by stating that $T_m = \max(T_1, T_2)$. Signal value $T_m$ along with signal value $T_o$ is received by summing operational amplifier 21 along with a reference value $T_{or}$. The output of operational amplifier 21 is signal value $T_m'$ which is best described as being defined by the mathematical relationship $T_m' = T_m - (T_o - T_{or})$. It is this value, $T_m'$ which is preferred as the x input for an x-y plotter. Additionally, operational amplifier 22 also receives signal values $T_1$ and $T_2$ and produces as an output signal value $\Delta T$ which is equal to $T_1 - T_2$. It is this signal value $\Delta T$ which is preferred as the y input to the aforementioned x-y plotter. If necessary, analog inverters may be employed to produce the negative of the signal values as shown for $T_o$ (to operational amplifier 21) and for $T_2$ (for operational amplifier 22). In one embodiment of the present invention, the plotter is provided with a recording medium, such as a sheet of paper, having predetermined normal, marginally normal, and abnormal regions defined thereon so that the pen position of the x-y recorder produces a continuous monitoring of the state of alignment of the thrust bearing.

Moreover, those components which are shown within the dotted lines of block 25 in FIG. 3 may be replaced by digital computer indication means. That is to say, block 25 may be a digital computer receiving analog signal values $T_1$, $T_2$ and $T_o$, converting them to digital form and operating on the resultant digital data to produce equivalent digital values for $\Delta T$ and $T_m'$. The binary equivalent of $T_{or}$ may be conveniently stored in a fixed or modifiable register. The digital calculations are readily performed by conventional digital hardware including registers and binary adder circuits. Similarly, the curves and/or regions shown labeled on the graph paper of the plotter may be digitized and stored so that the digital values for $T_m'$ and $\Delta T$ may be readily compared to determine the condition of the thrust bearing.

It should also be realized that while the specifically described apparatus of the present invention is employable as a continuous monitor of the bearing condition, the values $T_1$, $T_2$, and $T_o$ may be employed directly to determine thrust load, misalignment moment, minimum film thickness and actual misalignment.

The value $T_{or}$ is in general the oil feed design temperature for the thrust bearing. However, this value may also be employed to determine proper positioning of the recording pen of the x-y plotter along the horizontal axis as shown in the plotter of FIG. 3.

It should also be noted that, with respect to the present invention, more than one pair of thermocouples mounted on the thrust bearing may be provided. For example, a second pair of thermocouples mounted in an approximately horizontal plane could be employed to determine the state of horizontal misalignment. Such thermocouple pairs may be employed independently to determine the misalignment about any given axis. However, as pointed out above, it is the condition of vertical misalignment which is generally of greatest interest. However, the apparatus and methods of the present invention may obviously be employed to determine misalignment about other axes by employing appropriate diametrically opposed thermocouples.

From the above it may be appreciated that the methods and apparatus of the present invention provide for continuous monitoring of thrust bearing parameters with no intrusion upon their normal operation. This monitoring is accomplished essentially through the placement of as few as three thermocouples to determine certain specific temperature measurements from which these parameters may be determined. In particular, these parameters determine the relative condition of the thrust bearing with respect to misalignment about a selected axis. The apparatus of the present invention may be implemented in either analog or digital form, either of which may include visual display means continuously indicating thrust bearing misalignment and/or other parameters.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. Apparatus for continuously monitoring the state of alignment between a flow-lubricated thrust bearing and an associated rotating shaft, comprising:

a first temperature sensor disposed on said bearing for providing a signal $T_1$ indicative of the bearing temperature at a first position thereon;

a second temperature sensor disposed on said bearing for providing a signal $T_2$ indicative of the bearing temperature at a second position thereon, said first and second positions being substantially diametrically opposite each other;

a third temperature sensor disposed within a lubricant flow stream to said bearing for providing a signal $T_o$ indicative of the temperature of said lubricant flow stream;

a high value selector adapted to receive temperature signals $T_1$ and $T_2$ and operative to produce an output signal $T_m$ representative of the higher temperature of $T_1$ or $T_2$;

a first signal subtractor means adapted to receive signals $T_m$ and $T_o$ and operative to produce an output signal $T_m'$ representative of the difference between $T_m$ and $T_o$;

a second signal substractor means adapted to receive signals $T_1$ and $T_2$ and operative to produce an output signal $\Delta T$ representative of the difference between $T_1$ and $T_2$; and means simultaneously displaying values of $T_m'$ and $\Delta T$ for comparison with a first predetermined set of pairs of said $T_m'$ and $\Delta T$ values defining normal shaft-to-bearing alignment and with a second predetermined set of pairs of said $T_m'$ and $\Delta T$ values defining abnormal shaft-to-bearing alignment, said displayed values of $T_m'$ and $\Delta T$ assuming a correspondence with said first set of pairs or with said second set of pairs depending on the state of the alignment.

2. The apparatus of claim 1 wherein said simultaneously displayed values of $T_m'$ and $\Delta T$ are further compared with a third predetermined set of pairs of $T_m'$ and $\Delta T$ defining shaft to bearing alignment conditions intermediate to said normal and abnormal alignment, said displayed values of $T_m'$ and $\Delta T$ assuming a correspondence with said first set of pairs, said second set of pairs, or said third set of pairs depending on the state of alignment.

3. The apparatus of claim 2 wherein said displaying means comprises a two-coordinate visual display unit having indicia thereon corresponding to said first, said second, and said third sets of pairs of values of $T_m'$ and $\Delta T$ for immediate visual recognition of the state of alignment.

4. The apparatus of claim 3 wherein said visual display unit further includes means for continuously recording said displayed values of $T_m'$ and $\Delta T$.

5. The apparatus of claims 1 or 4 wherein said first and second temperature sensors are in substantially vertical alignment.

6. The apparatus of claim 5 wherein said first, second, and third temperature sensors comprise thermocouples.

7. The apparatus of claim 6 wherein said first and second signal subtractor means comprise operational amplifiers configured in signal subtraction networks.

8. A method for determining the state of alignment between a flow-lubricated thrust bearing and an associated rotating shaft, comprising the steps of:

(a) measuring the temperature $T_1$ of the bearing at a first bearing position;

(b) measuring the temperature $T_2$ of the bearing at a second bearing position substantially diametrically opposed to the first position;

(c) measuring the temperature $T_o$ of the lubricant flow into the bearing;

(d) selecting the higher of $T_1$ or $T_2$, defined as $T_m$;

(e) obtaining the difference between $T_1$ and $T_2$, defined as $\Delta T$;

(f) obtaining the difference between $T_m$ and $T_o$, defined as $T_m'$; and (g) comparing $T_m'$ and $\Delta T$ with predetermined paired values thereof, said predetermined paired values being categorized to define a first state of shaft to bearing alignment indicative of normal alignment and a second state of shaft to bearing alignment indicative of abnormal alignment, a correspondence between present values of $T_m'$ and $\Delta T$ with a predetermined pair being determinative of the present state of alignment.

9. The method of claim 8 wherein steps (a) through (g) are repeated continuously to provide a continuous indication of the state of alignment.

* * * * *